US011948046B2

(12) United States Patent
Griffin et al.

(10) Patent No.: US 11,948,046 B2
(45) Date of Patent: Apr. 2, 2024

(54) MVC INSPIRED QUANTUM-CLASSICAL SERVICE

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/824,813

(22) Filed: May 25, 2022

(65) Prior Publication Data

US 2023/0385671 A1 Nov. 30, 2023

(51) Int. Cl.
*G06N 10/20* (2022.01)
*G06F 9/54* (2006.01)
*G06N 10/70* (2022.01)

(52) U.S. Cl.
CPC ............ *G06N 10/20* (2022.01); *G06F 9/543* (2013.01); *G06N 10/70* (2022.01)

(58) Field of Classification Search
None
See application file for complete search history.

(56) References Cited

U.S. PATENT DOCUMENTS

| | | | |
|---|---|---|---|
| 11,169,801 B2 | 11/2021 | Cao | |
| 11,238,000 B2 | 2/2022 | Mohseni et al. | |
| 2002/0124054 A1* | 9/2002 | Dorn | G16H 40/67 709/217 |
| 2018/0260245 A1* | 9/2018 | Smith | G06F 9/542 |
| 2019/0102496 A1 | 4/2019 | Bishop et al. | |
| 2021/0158199 A1 | 5/2021 | Heckey et al. | |

OTHER PUBLICATIONS

McCaskey, A.J. et al. "A language and hardware independent approach to quantum-classical computing", SoftwareX 7 (Jul. 25, 2018), pp. 245-254.
McCaskey, A.J. et al. "XACC: A System-Level Software Infrastructure for Heterogeneous Quantum-Classical Computing", arXiv:1911.02452v1 [quant-ph] (Nov. 6, 2019), 17 pages.
Weder, Benjamin et al. "Integrating Quantum Computing into Workflow Modeling and Execution", IEEE Computer Society, Institute of Architecture of Application Systems, University of Stuttgart, Germany (Dec. 2020), 14 pages.

* cited by examiner

*Primary Examiner* — Craig C Dorais
(74) *Attorney, Agent, or Firm* — Womble Bond Dickinson (US) LLP

(57) ABSTRACT

Embodiments of the present disclosure provide techniques for seamlessly switching between a classical controller and a quantum controller that both implement an application, based on which controller is better suited for processing a received request for functionality of the application. The classical controller and the quantum controller both implement the same logic for the application, and the classical controller interfaces with a model and a view as part of a model, view and controller (MVC) framework. A Quantum Model View Controller (QMVC) service determines whether the request is to be processed by the classical or quantum controller. In response to determining that the request is to be processed by the quantum controller, the QMVC service diverts the request to the quantum controller and provide a first application program interface (API) gateway between the quantum controller and the model and a second API gateway between the quantum controller and the view.

20 Claims, 7 Drawing Sheets

MVC INSPIRED QUANTUM-CLASSICAL SERVICE

TECHNICAL FIELD

Aspects of the present disclosure relate to dynamically switching between quantum and classical controllers in order to service a request.

BACKGROUND

Model-View-Controller (MVC) is an architectural pattern (also referred to herein as the MVC framework) that separates an application into three main logical components: the model, the view, and the controller. Each of these components are built to handle specific development aspects of an application. The MVC framework separates internal representations of information from the ways information is presented to and accepted from the user. The model component of the MVC framework acts as the application's dynamic data structure and is independent of the user interface (UI). It directly manages the data, logic and rules of the application and represents the data-related logic that a user of the application interacts with. This can include either the data that is being transferred between the view and controller components or any other logic-related data. For example, a customer object will retrieve a customer's information from a database, manipulate it, and update it to the database or use it to render data.

The view component of the MVC framework may comprise the UI logic of the application and may comprise any representation of information such as a chart, diagram or table. For example, a customer view may include all the UI components such as text boxes, dropdowns, etc. that the user of the application interacts with. The controller component of the MVC framework accepts input and converts it to commands for the model or view components. The controller component acts as an interface between the model and view components to process all the logic and incoming requests, manipulate data using the model component and interact with the views to render the final output. For example, a customer controller will handle all the interactions and inputs from the customer view and update the database using the customer model.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
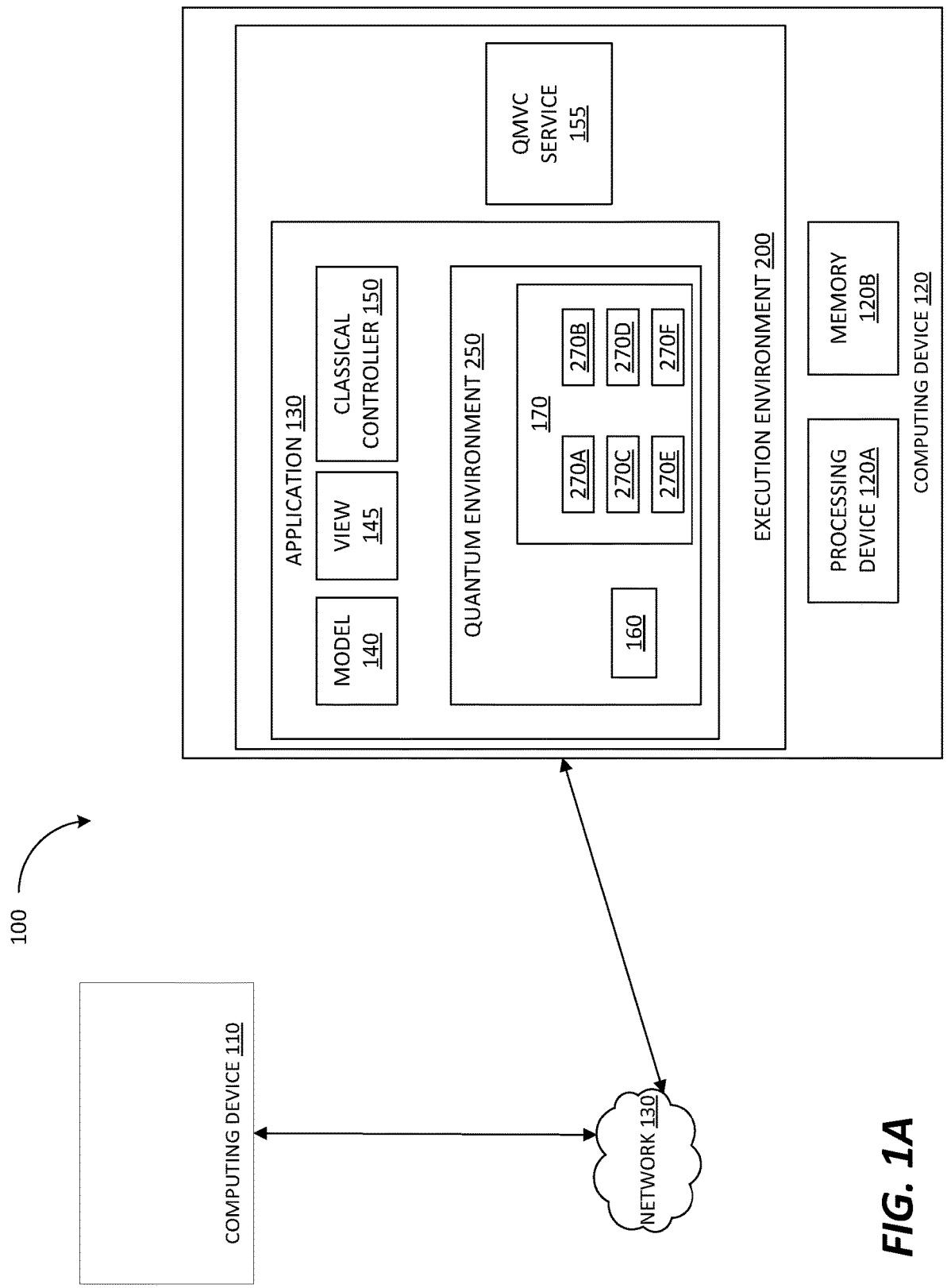
FIG. 1A is a block diagram that illustrates an example system, in accordance with some embodiments of the present disclosure.

When an application implemented using the MVC framework receives a request, it may process the request using a controller implemented using conventional hardware (referred to herein as a classical controller). However, the controller may also be implemented using quantum hardware (referred to herein as a quantum controller). Quantum computing is a type of computation that harnesses the collective properties of quantum states, such as superposition, interference, and entanglement, to perform calculations. The devices that perform quantum computations are known as quantum computers. Although there are different types of quantum computers, one of the most widely used is the quantum circuit, based on the quantum bit (also referred to as a "qubit"). A qubit can be in a 1 or 0 quantum state, or in a superposition of the 1 and 0 states. When it is measured, however, it is always 0 or 1 and the probability of either outcome depends on the qubit's quantum state immediately prior to measurement. Using a classical controller, a search problem with a search space of N items requires examination of the search space on the order of N times to find the item being sought. However, a quantum controller may solve the search problem after examining the search space approximately $\sqrt{N}$ times.

Because MVC frameworks allow for changing of the controller and/or model components used to execute a request without refactoring the entire application, they can be implemented using both classical and quantum controllers (i.e., a controller(s) implemented using conventional hardware as well as a controller(s) implemented using quantum hardware), where certain requests are executed using classical controllers and others are executed using quantum controllers. However, current quantum computers are classified as being in the non-intermediate scale quantum (NISQ) era, which means that they lack stability because of errors resulting from noise. As a result, in systems implemented with both classical and quantum controllers, it is advantageous to offload execution of riskier parts of a request (e.g., functions with more noise involved) to the classical controller. An MVC framework may execute harder/more computationally difficult functions (e.g., complex combinatorial problems) using a quantum controller, and easier/less computationally difficult functions using a classical controller.

Based on the above, it is important to be able to dynamically determine whether to service a request using a classical or quantum controller, as this will allow for smart scheduling and algorithmic/service level analysis to gauge which controller to execute a request on. However, determination of the optimal controller to use for executing a particular request requires analysis of a number of factors pertinent to both the request and the quantum hardware and is not easily performed in a dynamic manner.

The present disclosure addresses the above-noted and other deficiencies by providing techniques for seamlessly switching between a classical controller and a quantum controller that both implement an application, based on which controller is better suited for processing a received request for functionality of the application. The application is implemented in an execution environment comprising a classical controller and a quantum controller, which both implement the same logic for the application, and the classical controller interfaces with a model and a view as part of a model, view and controller (MVC) framework. A Quantum Model View Controller (QMVC) service may be provided, that may determine whether the request is to be processed by the classical controller or the quantum controller and may act as a communication bridge between the quantum controller and the model and the view. The QMVC service may make this determination based on the search space of the request and the workload on the quantum controller. In response to determining that the request is to be processed by the quantum controller, the QMVC service may divert the request to the quantum controller process the request using the quantum controller, wherein the QMVC service provides a first application program interface (API) gateway between the quantum controller and the model and a second API gateway between the quantum controller and the view. Because both the quantum and classical controllers execute the same application functionality from a logic perspective, for each request to be processed by the application, the QMVC service 155 may determine the optimal controller for handling the request and may switch to the determined optimal controller without needing to rewrite the entire application.

FIG. 1A is a block diagram that illustrates an example system 100. As illustrated in FIG. 1A, the system 100 includes computing devices 110 and 120, and a network 130. The computing devices 110 and 120 may be coupled to each other (e.g., may be operatively coupled, communicatively coupled, may communicate data/messages with each other) via network 130. Network 130 may be a public network (e.g., the internet), a private network (e.g., a local area network (LAN) or wide area network (WAN)), or a combination thereof. In one embodiment, network 130 may include a wired or a wireless infrastructure, which may be provided by one or more wireless communications systems, such as a WiFi™ hotspot connected with the network 130 and/or a wireless carrier system that can be implemented using various data processing equipment, communication towers (e.g. cell towers), etc. The network 130 may carry communications (e.g., data, message, packets, frames, etc.) between computing devices 110 and 120. Each of the computing devices 110 and 120 may include hardware such as processing device 115A (e.g., processors, central processing units (CPUs), memory 115B (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

Each of the computing devices 110 and 120 may comprise any suitable type of computing device or machine that has a programmable processor including, for example, server computers, desktop computers, laptop computers, tablet computers, smartphones, set-top boxes, etc. In some examples, the computing devices 110 and 120 may comprise a single machine or may include multiple interconnected machines (e.g., multiple servers configured in a cluster). The computing devices 110 and 120 may be implemented by a common entity/organization or may be implemented by different entities/organizations. For example, computing device 110 may be operated by a first company/corporation and computing device 120 may be operated by a second company/corporation. The computing devices 110 and 120 may each execute or include an operating system (OS), as discussed in more detail below. The OSs of each computing device 110 and 120 may manage the execution of other components (e.g., software, applications, etc.) and/or may manage access to the hardware (e.g., processors, memory, storage devices etc.) of their respective computing device.

Figure 1B:
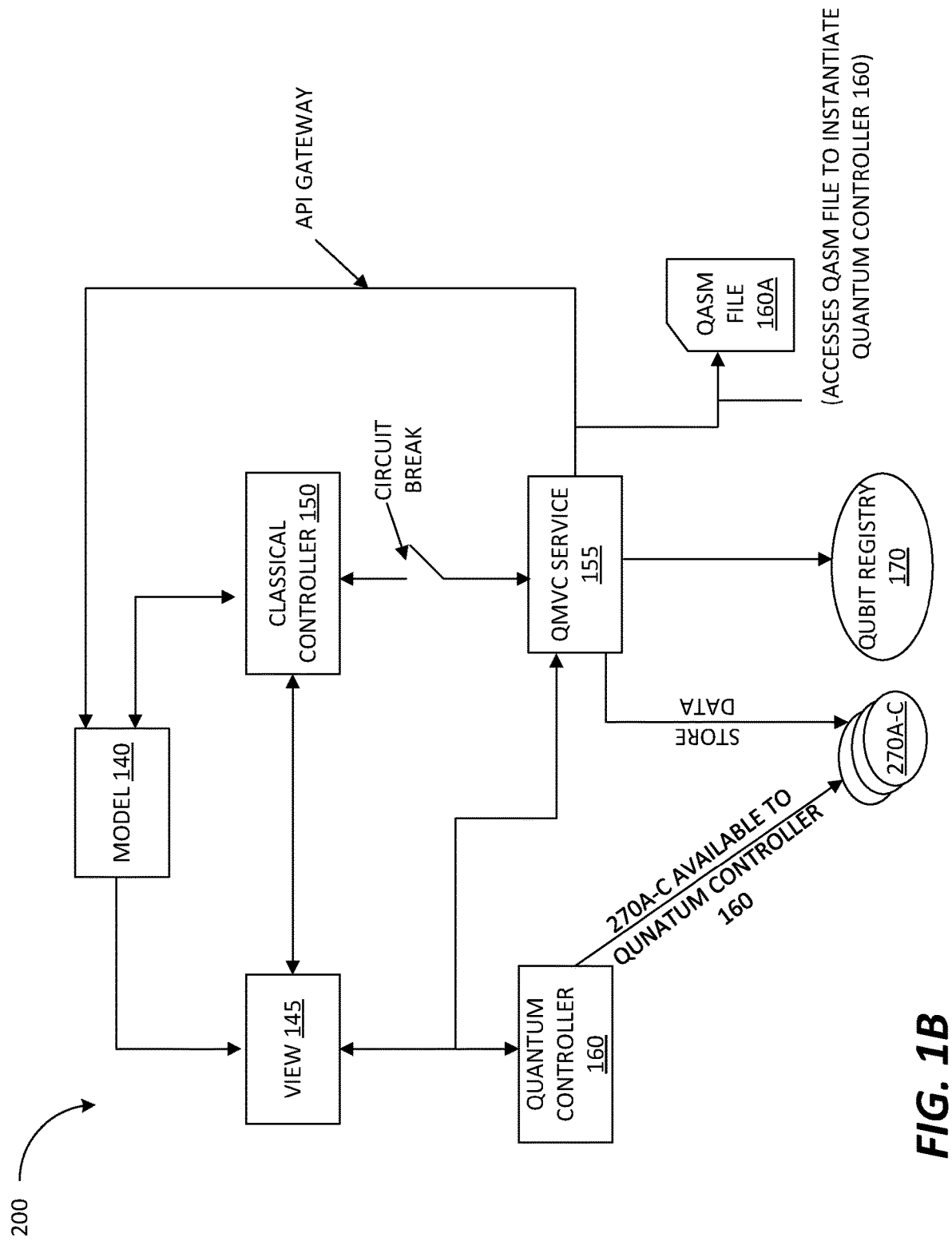
FIG. 1B is a block diagram that illustrates an example MVC-style execution environment, in accordance with some embodiments of the present disclosure.

As shown in FIG. 1A, the computing device 120 may include an application 130. The embodiments of the present disclosure may be discussed with respect to an example in which application 130 is a route planning application that will plan a route from a first location to a second location, while accounting for various constraints. For example, the application 130 may operate with certain optimization constraints, such as time optimization (e.g., sticking to motorways), cost optimization (avoiding toll roads), traffic optimization (using only back roads), fuel/battery efficiency etc. The application 130 may also be configured to map certain types of waypoints/stops on the route (e.g., restrooms, restaurants, towns, etc.). The application 130 may be implemented using the execution environment 200, which may be based on the MVC framework discussed herein and thus may include a model 140, a view 145, and a classical controller 150 which may be coded in any classical language such as Java or Python (and may be implemented using conventional hardware). FIG. 1B illustrates the execution environment 200.

However, performing route planning for more complex routes using the classical controller 150 requires running all of the possible combinatorial approaches to route planning sequentially. Thus, when planning a route from location A to location Z with a set of stops and a set of optimization constraints, there could be a large number of ways to plan the route which would require a significant amount of time and resources if performed using the classical controller 150. However, because qubits can hold both a 1 and a 0 value, a quantum system with N qubits will provide $2^N$ permutations, which can be run simultaneously by putting the qubits into superposition. This allows a quantum controller to determine the optimal route at the quantum speed of $2^N$, where all routes are visible at the same time. As a result, in the execution environment 200, the application 130 is also implemented using a quantum controller 160 which may be coded using any appropriate quantum language such as quantum assembly (QASM) or Q#. In the examples described herein, the quantum controller 160 is implemented using QASM and is defined by a QASM file 160A as shown in FIG. 1B. Referring simultaneously to FIGS. 1A and 1B, the classical controller 150 and the quantum controller 160 may be coded (in their respective languages) with the same logic for route navigation, prioritization, and constraint optimization, etc. The quantum controller 160 may be part of a quantum environment 250 which may include the quantum controller 160 and a qubit registry 170 having Qubits 270A-270F. The QASM file 160A may interface with Qubits 270 in the Qubit registry 170 as discussed in further detail herein.

The execution environment 200 may further include a Quantum Model View Controller (QMVC) service 155 that acts as an execution hub and is responsible for making the decision as to whether to process a request using the classical controller 150 or the quantum controller 160. The QMVC service 155 may make this decision based on a number of factors. One such factor is the search space of the request (i.e., the characteristics of the search space of the request). The characteristics of the search space of the request may include the size of the search space and the complexity of the search space. When the search space is relatively large and/or complex, the QMVC service 155 may determine that the classical controller 150 will be unable to handle the request, and that the request should be processed using the quantum controller 160 (if it is able to based on other factors as determined herein). For example, if the QMVC service 155 receives a request for planning a route that includes multiple stops, with multiple constraints (e.g., traffic, time, and cost constraints) that vary on a stop by stop basis, the QMVC service 155 may determine that the classical controller 150 will require an unacceptably long time to plan the route (or may not be able to plan the route at all). If, however, the search space of the request is relatively small and/or uncomplicated, then the QMVC service 155 may determine that the classical controller 150 may be able to analyze the search space and generate a result quickly (e.g., within seconds). The QMVC service 155 may therefore determine (accounting for other factors as described herein) that the difference in performance between the classical and quantum controllers does not justify the resources required to execute the request using the quantum controller 160 and assign the request to the classical controller 150.

The QMVC 155 may also decide whether to process a request using the classical controller 150 or the quantum controller 160 based on a current workload of the quantum controller 160. More specifically, the quantum controller 160 (like any quantum system) is adversely affected by noise because noise causes errors which in turn produce heat, since the quantum controller 160 has to work harder to counter the errors (e.g., using various error correction techniques). Because the quantum controller 160 must be maintained at extremely low temperatures (where the quantum phenomenon of entanglement occurs), an increase in heat due to e.g., excessive error correction may have an adverse effect on the performance of the quantum controller 160. In addition, when the quantum controller 160 is handling a large number of tasks and/or handling very complex tasks, contention between these different tasks may result in an insufficient number of available qubits 270, which may also hinder the quantum controller 160's ability to effectively execute an additional request.

In order to determine the workload on the quantum controller 160, the QMVC service 155 may monitor the quantum environment 250 for error rate, temperature level, and an available number of qubits 270 among other factors. If the QMVC service 155 determines that the workload on the quantum controller 160 is too high based on these factors, the QMVC service 155 may determine that adding execution of another request to the quantum controller 160's workload may incur a risk that the quantum controller 160 will not be able to determine an optimal solution or will take too long to determine the optimal solution (e.g., because the temperature will be too high and/or the error rate will be too large as a result of processing the request). Thus, the QMVC service 155 may determine that the request should be processed by the classical controller 150 if the workload of the quantum controller 160 is too high.

Because the application 130 (like many applications) may be constantly running, the QMVC service 155 may be constantly monitoring the quantum environment 250 to determine when and to what extent the workload on the quantum controller 160 is too high. When a request is received, the QMVC service 155 may balance the search space characteristics and the workload of the quantum controller 160 when determining whether to service a request using the classical controller 150 or the quantum controller 160. In some embodiments, if the QMVC service 155 determines that the workload on the quantum controller 160 is beyond a threshold (e.g., such that it is unlikely to be able to handle a request regardless of the search space), it may automatically prevent any requests from being received by the quantum controller 160 and divert all requests to the classical controller 150 using a circuit breaker-style action as described in further detail herein.

Figure 1C:
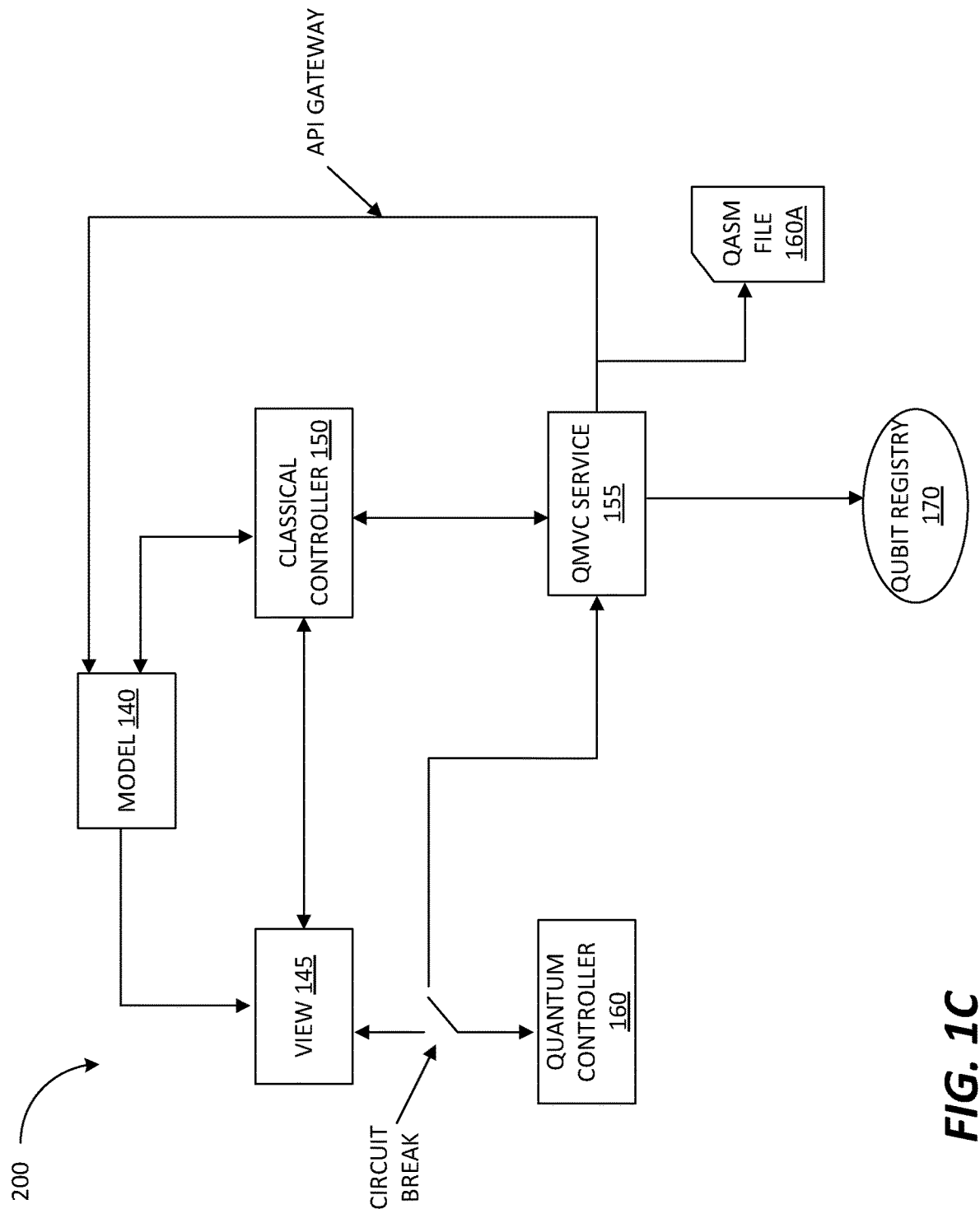
FIG. 1C is a block diagram that illustrates an example MVC-style execution environment, in accordance with some embodiments of the present disclosure.
Figure 1D:
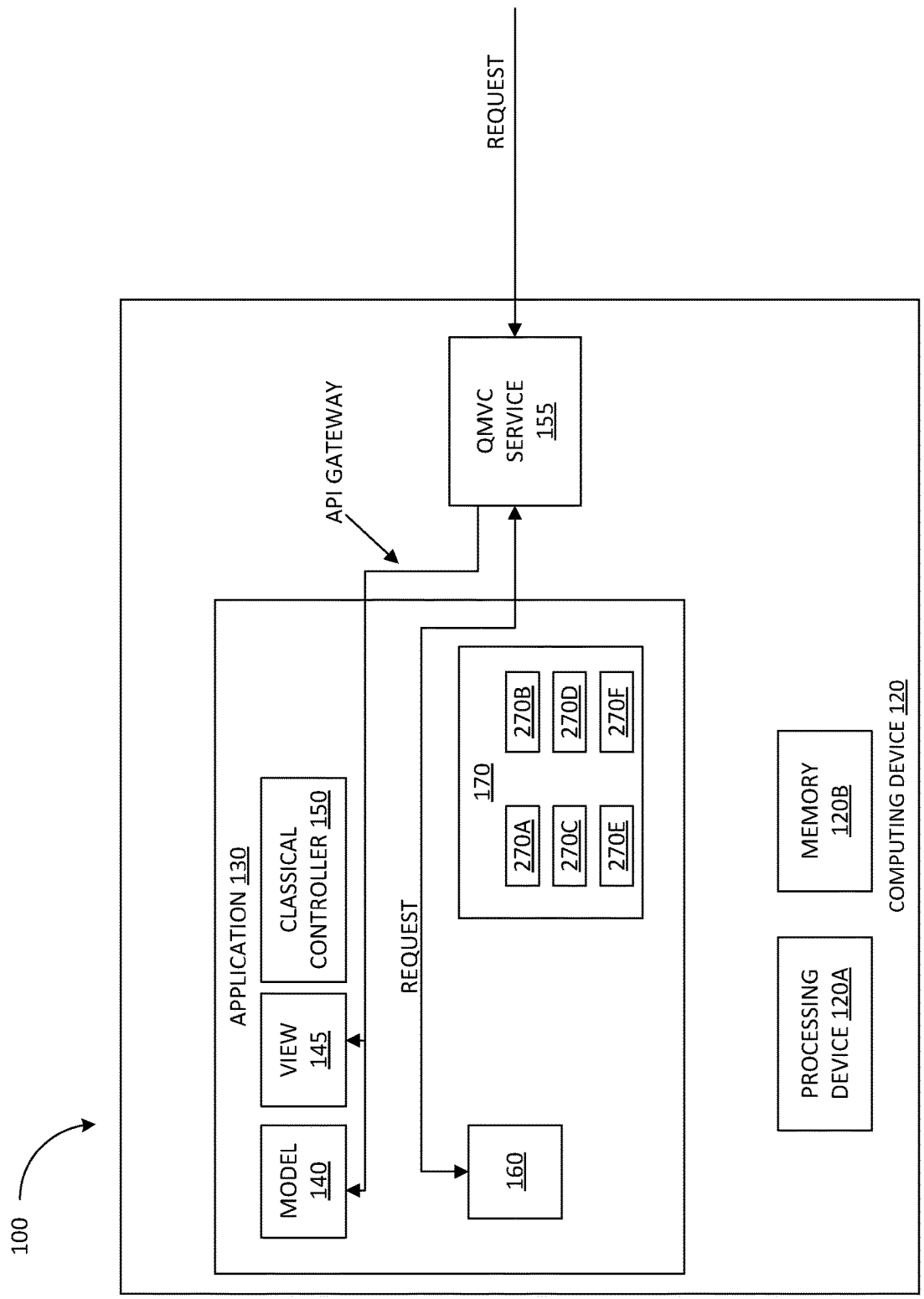
FIG. 1D is a block diagram that illustrates a computing device implementing the example MVC-style execution environment of FIG. 1B, in accordance with some embodiments of the present disclosure.

Referring to FIG. 1B and 1D, upon receiving a request to plan a route, the QMVC service 155 may determine whether the request should be handled by the classical controller 150 or the quantum controller 160 as described hereinabove. For example, the request may comprise a request to plan a route from location B to location Y, with 3 different constraints. The QMVC service 155 may determine that the search space of the request (based on the locations B and Y and 3 different constraints) is too large and overly complex for the classical controller 150. The QMVC service 155 may check the qubit registry 170 to determine, based on the parameters/search space characteristics of the request, if there are sufficient qubits 270 to execute the request. The qubit registry 170 may act as a qubit manager that monitors which qubits 270 are available and may inform the QMVC service 155 that a sufficient number of qubits 270 are available (e.g., 3 qubits 270A-270C, one for each of the 3 constraints). The QMVC service 155 may also check the quantum environment 250 that the quantum controller 160 is deployed within and determine that the temperature of the quantum environment 250 is acceptable and that the error rate of the quantum controller 160 is acceptable (and that these parameters will remain so if the quantum controller 160 is assigned the request). Thus, the QMVC service 155 may determine that the request should be handled by the quantum controller 160.

Upon determining that the request should be serviced by the quantum controller 160, the QMVC service 155 may implement a circuit breaker-style action in order to stop the classical controller 150 from receiving the request. The QMVC service 155 may then access the QASM file 160A in order to instantiate the quantum controller 160 and interface with the qubit registry 170 in order to lock down the appropriate qubits 270A-C as defined by the QASM file 160A. The QMVC service 155 may also lock down an appropriate number of additional qubits for retrieving data. The QMVC service 155 may then update a service file with the details of the locked down qubits 270A-C. The QMVC service 155 may then act as an API gateway between the quantum controller 160 and the model 140 and between the quantum controller 160 and the view 145, allowing the quantum controller 160 to communicate with the classical model 140 and classical view 145 via the QMVC service 155.

When the quantum controller 160 needs data, it may request it from the model 140 (using e.g., getters) and the QMVC service 155 may write the data to one or more of the allocated qubits 270A-C (e.g., 270A and 270B) and make those qubits 270A and B available to the quantum controller 160 to work with. When the view 145 needs to be initiated, the QMVC service 155 may check for qubit safety before initiating a read on the relevant qubits 270A and B. More specifically, a qubit 270 that is associated with the quantum controller 160 may be simultaneously used by another quantum service, which may be utilizing that qubit as part of a quantum entanglement scenario. Any attempts to read or interact with a qubit that is in quantum entanglement may cause decoherence, which can result in a failure of the quantum entanglement and thus cause the service associated with that entanglement to fail. Additionally, the failures could cause instability at the hardware level, further exacerbating the issues that decoherence can cause. Thus, when the view 145 needs to be initiated, the QMVC service 155 may check for qubit safety by interfacing with the qubit registry 170 to ensure that the qubits 270A and B which are to be read are not currently being worked on by the quantum controller 160. The QMVC service 155 may then initiate a read on the relevant qubits 270A and B and send the relevant data to the view 145. When the view 145 requests data from the quantum controller 160, the QMVC service 155 holds the request, checks for qubit safety as discussed hereinabove, and initiates a read of the relevant qubits 270A-C. When the quantum controller 160 wishes to set data in the model 140, the QMVC service 155 retrieves the data from the relevant qubits 270A-C and sends the data to the model 140.

Thus, upon the quantum controller 160 determining an optimal route from location B to location Y, the optimal route can be transmitted to the view 145 via the QMVC service 155, and the quantum controller 160 may update the model 140 with the optimal route information via the QMVC service 155 as well.

If upon receiving a request, the QMVC service 155 determines that the request should be processed by the classical controller 150, the QMVC service 155 may divert all requests to the classical controller 150 using a circuit breaker-style action as shown in FIG. 1C. In some embodiments, if the QMVC service 155 determines that the workload on the quantum controller 160 is beyond a threshold (e.g., such that it is unlikely to be able to handle a request regardless of the search space), it may automatically prevent any requests from being received by the quantum controller 160 and divert all requests to the classical controller 150 (using the circuit breaker-style action as shown in FIG. 1C) until the workload on the quantum controller 160 has reduced below the threshold (at which point it may determine which controller should service incoming requests as discussed herein).

The embodiments of the present disclosure allow for a dynamic MVC-style execution environment that can swap seamlessly and intelligently between a quantum and classical controller that are both implementing an application. Because both the quantum and classical controllers execute the same application functionality from a logic perspective, for each request to be processed by the application, the QMVC service 155 may determine the optimal controller for handling the request and may switch to the determined optimal controller without needing to rewrite the entire application.

Continuing to refer to FIG. 1B, in some embodiments, the QMVC service 155 may provide translation level services to automatically translate changes in the base logic/code of the classical controller 150 to the base logic/code of the quantum controller 160 and vice versa. When changes are made in the Java code of the classical controller 150, because the QMVC service 155 has access to the model 140 and the view 145, it can translate such changes and replicate them in the quantum code (e.g., the QASM file 160A) of the quantum controller 160.

Figure 2:
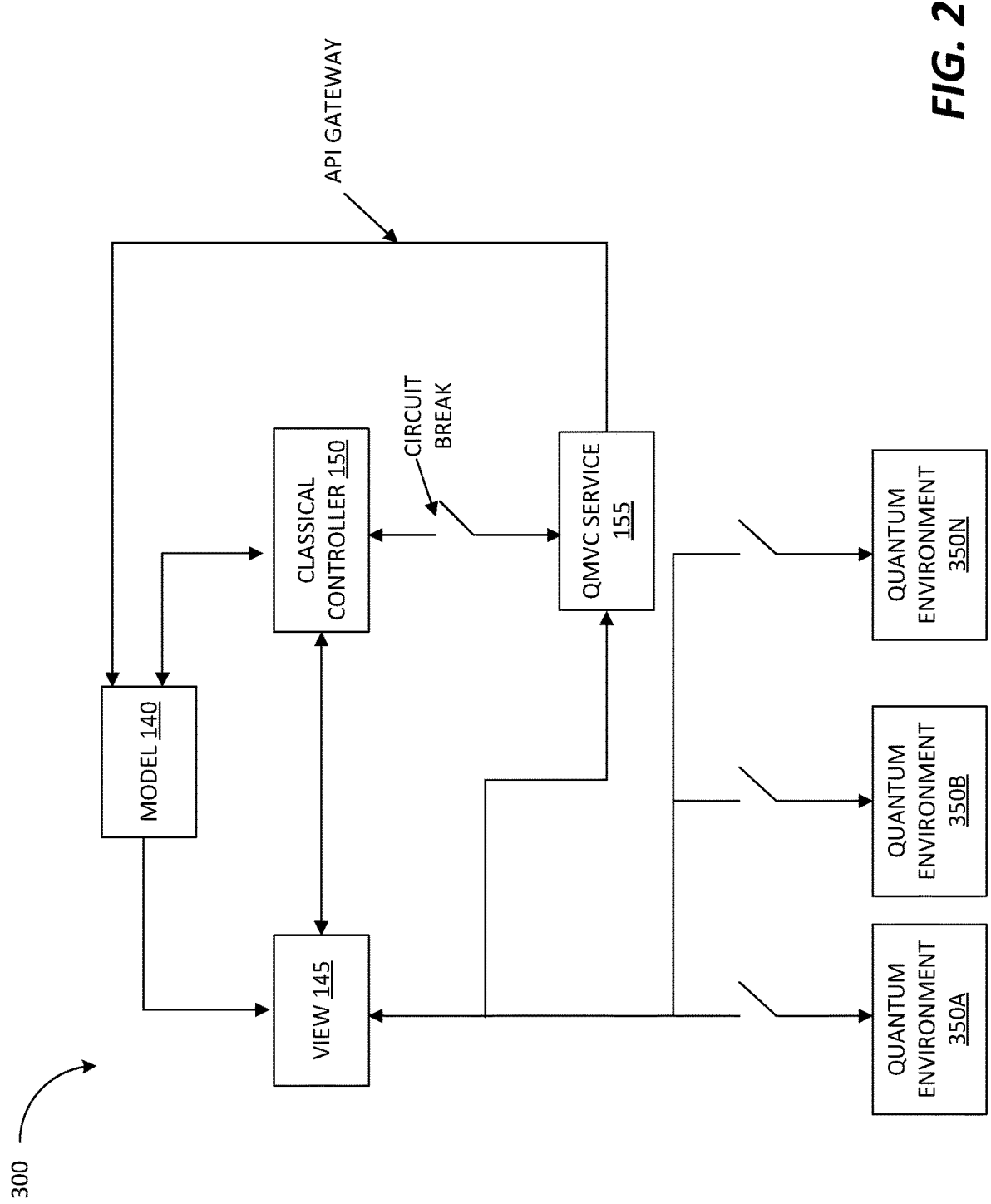
FIG. 2 is a block diagram that illustrates an example MVC-style execution environment with multiple quantum controllers, in accordance with some embodiments of the present disclosure.

In some embodiments, the execution environment 200 may have multiple quantum controllers on different quantum environments, where each quantum environment has its own performance profile. This is illustrated in FIG. 2, which illustrates an execution environment 300 that is similar to execution environment 200 but includes multiple quantum environments 350. A quantum environment performance profile can include parameters such as temperature, number of qubits available, total number of qubits, T1/T2 times (which indicate coherence, error correction statistics (how many errors the quantum environment 200 is encountering), and qubit material type (e.g. silicone or photons). For example, some quantum hardware environments have qubits made from silicon, while other quantum hardware environments may be made of other composite materials. A user may wish to optimize the processing of a request for speed, quality, noise resiliency, error correction technique (as each quantum hardware environment 350 may have its own error correction scheme), or any other appropriate optimization factor. Thus, the QMVC service 155 can receive from the user, preferences on what optimization factor(s) the processing of requests should be optimized on. When it is determined what optimization factor(s) the processing of a newly received request should be optimized on, the QMVC service 155 may select a quantum environment 350 that has a performance profile suited for optimizing the selected factors.

Figure 3:
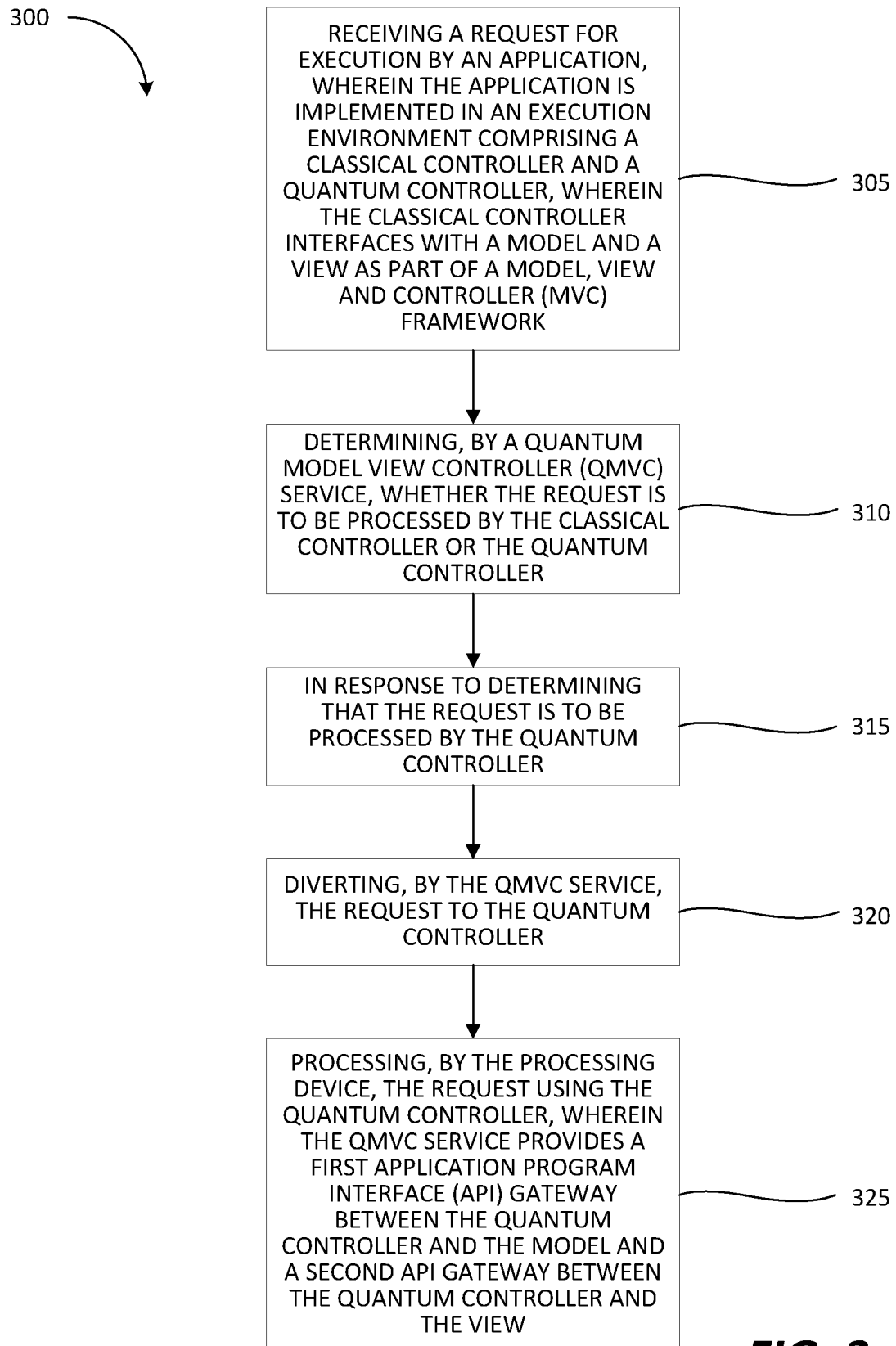
FIG. 3 is a flow diagram of a method of seamlessly switching between a classical controller and a quantum controller that both implement an application, based on which controller is better suited for processing a received request for functionality of the application, in accordance with some embodiments of the present disclosure.

FIG. 3 is a flow diagram of a method 300 for seamlessly switching between a classical controller and a quantum controller that both implement an application, based on which controller is better suited for processing a received request for functionality of the application, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof In some embodiments, the method 300 may be performed e.g., computing device 120 (executing the QMVC service 155) illustrated in FIG. 1A.

Referring simultaneously to FIG. 1B, at block 305, the QMVC service 155 may receive a request for execution by application 130, the application 130 being is implemented in an execution environment 200 comprising a classical controller 150 and a quantum controller 160. The classical controller 150 may interface with a model 140 and a view 145 as part of a model, view and controller (mvc) framework as discussed herein. At block 310, upon receiving the request, the QMVC service 155 may determine whether the request should be handled by the classical controller 150 or the quantum controller 160 as described hereinabove. For example, the request may comprise a request to plan a route from location B to location Y, with multiple stops in between and 3 different optimization constraints. The QMVC service 155 may determine that the search space of the request (based on the locations B and Y, the stops in between, and the 3 different optimization constraints) is too large and overly complex for the classical controller 150. The QMVC service 155 may check the qubit registry 170 to determine, based on the parameters/search space characteristics of the request, if there are sufficient qubits 270 to execute the request. The qubit registry 170 may act as a qubit manager that monitors which qubits 270 are available and may inform the QMVC service 155 that a sufficient number of qubits 270 are available (e.g., 3 qubits 270A-270C, one for each of the 3 constraints). The QMVC service 155 may also check the quantum environment 250 that the quantum controller 160 is deployed within and determine that the temperature of the quantum environment 250 is acceptable and that the error rate of the quantum controller 160 is acceptable (and that these parameters will remain so if the quantum controller 160 is assigned the request). Thus, at bock 315 the QMVC service 155 may determine that the request should be handled by the quantum controller 160.

At block 320, upon determining that the request should be serviced by the quantum controller 160, the QMVC service 155 implement a circuit breaker-style action in order to stop the classical controller 150 from receiving the request. At block 325, the QMVC service 155 may utilize the quantum controller 160 to process the request. More specifically, the QMVC service 155 may access the QASM file 160A in order to instantiate the quantum controller 160 and interface with the qubit registry 170 in order to lock down the appropriate qubits 270A-C as defined by the QASM file 160A. The QMVC service 155 may also lock down an appropriate number of additional qubits for retrieving data. The QMVC service 155 may then update a service file with the details of the locked down qubits 270A-C. The QMVC service 155 may then act as an API gateway between the quantum controller 160 and the model 140 and between the quantum controller 160 and the view 145, allowing the quantum controller 160 to communicate with the classical model 140 and classical view 145 via the QMVC service 155.

When the quantum controller 160 needs data, it may request it from the model 140 (using e.g., getters) and the QMVC service 155 may write the data to one or more of the allocated qubits 270A-C (e.g., 270A and 270B) and make those qubits 270A and B available to the quantum controller 160 to work with. When the view 145 needs to be initiated, the QMVC service 155 may check for qubit safety before initiating a read on the relevant qubits 270A and B. More specifically, a qubit 270 that is associated with the quantum controller 160 may be simultaneously used by another quantum service, which may be utilizing that qubit as part of a quantum entanglement scenario. Any attempts to read or interact with a qubit that is in quantum entanglement may cause decoherence, which can result in a failure of the quantum entanglement and thus cause the service associated with that entanglement to fail. Additionally, the failures could cause instability at the hardware level, further exacerbating the issues that decoherence can cause.

Thus, when the view 145 needs to be initiated, the QMVC service 155 may check for qubit safety by interfacing with the qubit registry 170 to ensure that the qubits 270A and B which are to be read are not currently being worked on by the quantum controller 160. The QMVC service 155 may then initiate a read on the relevant qubits 270A and B and send the relevant data to the view 145. When the view 145 requests data from the quantum controller 160, the QMVC service 155 holds the request, checks for qubit safety as discussed hereinabove, and initiates a read of the relevant qubits 270A-C. When the quantum controller 160 wishes to set data in the model 140, the QMVC service 155 retrieves the data from the relevant qubits 270A-C and sends the data to the model 140.

Thus, upon the quantum controller 160 determining an optimal route from location B to location Y, the optimal route can be transmitted to the view 145 via the QMVC service 155, and the quantum controller 160 may update the model 140 with the optimal route information via the QMVC service 155 as well.

Figure 4:
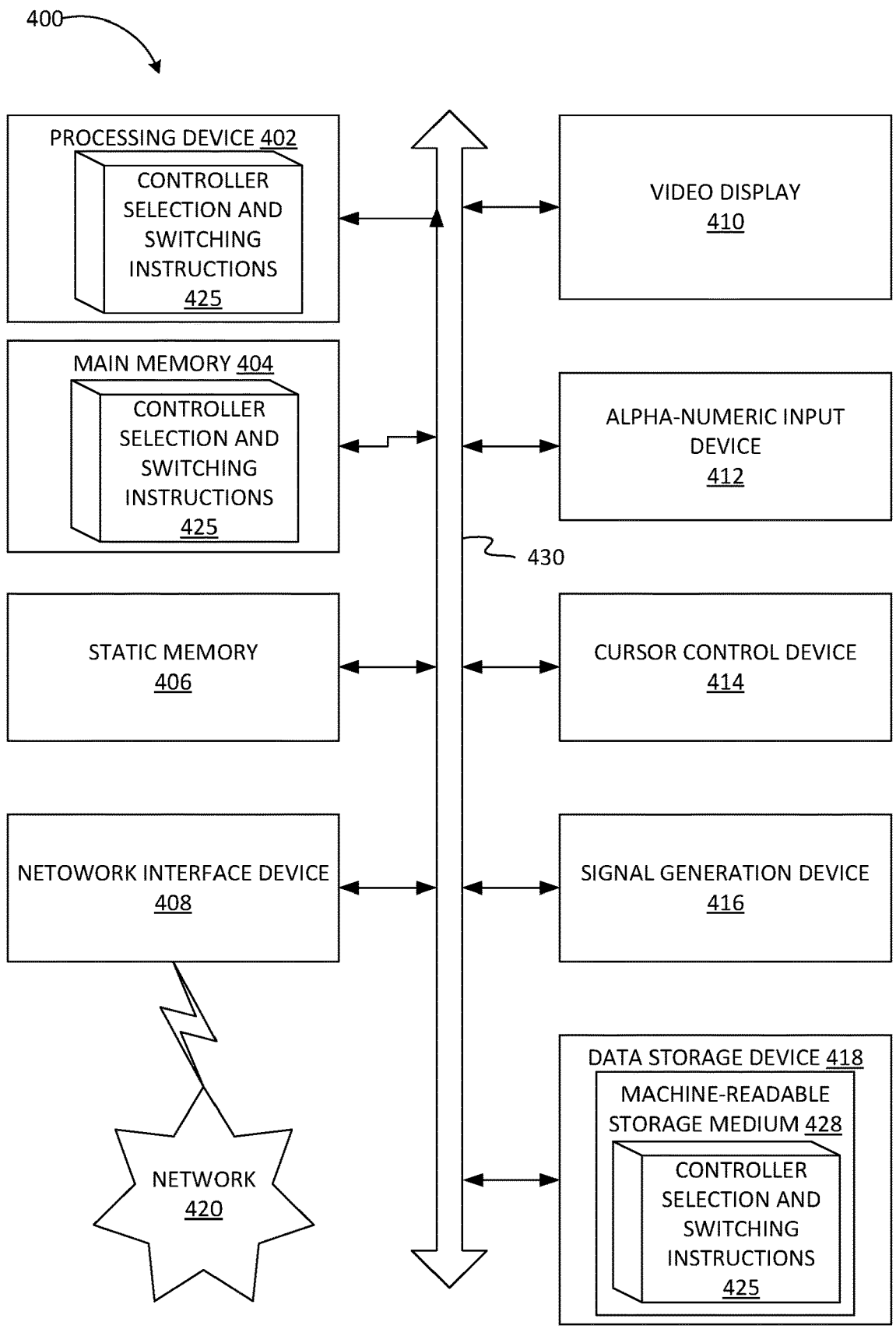
FIG. 4 is a block diagram of an example computing device that may perform one or more of the operations described herein, in accordance with some embodiments of the present disclosure.

FIG. 4 illustrates a diagrammatic representation of a machine in the example form of a computer system 400 within which a set of instructions, for causing the machine to perform any one or more of the methodologies discussed herein for seamlessly switching between a classical controller and a quantum controller that both implement an application, based on which controller is better suited for processing a received request for functionality of the application.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a server.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute controller selection and switching instructions 425, for performing the operations and steps discussed herein.

The data storage device 418 may include a machine-readable storage medium 428, on which is stored one or more sets of controller selection and switching instructions 425 (e.g., software) embodying any one or more of the methodologies of functions described herein. The controller selection and switching instructions 425 may also reside, completely or at least partially, within the main memory 404 or within the processing device 402 during execution thereof by the computer system 400; the main memory 404 and the processing device 402 also constituting machine-readable storage media. The controller selection and switching instructions 425 may further be transmitted or received over a network 420 via the network interface device 408.

The machine-readable storage medium 428 may also be used to store instructions to perform a method for object analysis/validation event publishing, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:
1. A method comprising:
  receiving a request for execution by an application, wherein the application is implemented in an execution environment comprising a classical controller and a quantum controller, wherein the classical controller interfaces with a model and a view as part of a model view and controller (MVC) framework;

determining, by a Quantum Model View Controller (QMVC) service, whether the request is to be processed by the classical controller or the quantum controller; and in response to determining that the request is to be processed by the quantum controller:

diverting, by the QMVC service, the request to the quantum controller; and processing, by the processing device, the request using the quantum controller, wherein the QMVC service provides a first application program interface (API) gateway between the quantum controller and the model and a second API gateway between the quantum controller and the view.

2. The method of claim 1, wherein determining, by the QMVC service, whether the request is to be serviced by the classical controller or the quantum controller comprises:

determining characteristics of a search space of the request and a workload on the quantum controller; and determining whether the request is to be serviced by the classical controller or the quantum controller based on one or more of the characteristics of the search space and the load on the quantum controller.

3. The method of claim 2, wherein:

the characteristics of the search space include a size and complexity of the search space; and the workload on the quantum controller includes an error rate of the quantum controller, a temperature level of a quantum environment in which the quantum controller is executing, and a number of available qubits in the quantum environment in which the quantum controller is executing.

4. The method of claim 3, further comprising:

interfacing, by the QMVC Service, with a qubit registry of the quantum environment to reserve one or more of the available qubits in the quantum environment that are required to process the request.

5. The method of claim 4, wherein processing the request using the quantum controller comprises:

routing, via the QMVC service, requests to write data and requests to access data between the model, the view, and the quantum controller.

6. The method of claim 1, further comprising:

translating, via the QMVC service, a set of data from a source file of the classical controller to a source code file of the quantum controller.

7. The method of claim 1, wherein the quantum controller is one of a plurality of quantum controllers that the execution environment is comprised of, each of the plurality of quantum controllers having a performance profile, and wherein the method further comprises:

receiving a second request for execution by the application, the second request indicating one or more optimization factors the second request is to be optimized based on; and determining a particular quantum controller of the plurality of quantum controllers that the second request is to be processed on based on the one or more parameters and the performance profile of each of the plurality of quantum controllers.

8. A system comprising:

a memory; and a processing device operatively coupled to the memory, the processing device to:

receive a request for execution by an application, wherein the application is implemented in an execution environment comprising a classical controller and a quantum controller, wherein the classical controller interfaces with a model and a view as part of a model view and controller (MVC) framework;

determine, by a Quantum Model View Controller (QMVC) service, whether the request is to be processed by the classical controller or the quantum controller; and in response to determining that the request is to be processed by the quantum controller:

divert, by the QMVC service, the request to the quantum controller; and process the request using the quantum controller, wherein the QMVC service provides a first application program interface (API) gateway between the quantum controller and the model and a second API gateway between the quantum controller and the view.

9. The system of claim 8, wherein to determine by the QMVC service whether the request is to be serviced by the classical controller or the quantum controller, the processing device is to:

determine characteristics of a search space of the request and a workload on the quantum controller; and determine whether the request is to be serviced by the classical controller or the quantum controller based on one or more of the characteristics of the search space and the load on the quantum controller.

10. The system of claim 9, wherein the characteristics of the search space include a size and complexity of the search space and the workload on the quantum controller includes an error rate of the quantum controller, a temperature level of a quantum environment in which the quantum controller is executing, and a number of available qubits in the quantum environment in which the quantum controller is executing.

11. The system of claim 10, wherein the processing device is further to:

interface, by the QMVC Service, with a qubit registry of the quantum environment to reserve one or more of the available qubits in the quantum environment that are required to process the request.

12. The system of claim 11, wherein to process the request using the quantum controller, the processing device is to:

route, via the QMVC service, requests to write data and requests to access data between the model, the view, and the quantum controller.

13. The system of claim 8, wherein the processing device is further to:

translate, via the QMVC service, a set of data from a source file of the classical controller to a source code file of the quantum controller.

14. The system of claim 8, wherein the quantum controller is one of a plurality of quantum controllers that the execution environment is comprised of, each of the plurality of quantum controllers having a performance profile, and wherein the processing device is further to:

receive a second request for execution by the application, the second request indicating one or more optimization factors the second request is to be optimized based on; and determine a particular quantum controller of the plurality of quantum controllers that the second request is to be processed on based on the one or more parameters and the performance profile of each of the plurality of quantum controllers.

15. A non-transitory computer-readable medium having instructions stored thereon which, when executed by a processing device, cause the processing device to:
- receive a request for execution by an application, wherein the application is implemented in an execution environment comprising a classical controller and a quantum controller, wherein the classical controller interfaces with a model and a view as part of a model view and controller (MVC) framework;
- determine, by a Quantum Model View Controller (QMVC) service, whether the request is to be processed by the classical controller or the quantum controller; and
- in response to determining that the request is to be processed by the quantum controller:
  - divert, by the QMVC service, the request to the quantum controller; and
  - process, by the processing device, the request using the quantum controller, wherein the QMVC service provides a first application program interface (API) gateway between the quantum controller and the model and a second API gateway between the quantum controller and the view.

16. The non-transitory computer-readable medium of claim 15, wherein to determine by the QMVC service whether the request is to be serviced by the classical controller or the quantum controller, the processing device is to:
- determine characteristics of a search space of the request and a workload on the quantum controller; and
- determine whether the request is to be serviced by the classical controller or the quantum controller based on one or more of the characteristics of the search space and the load on the quantum controller.

17. The non-transitory computer-readable medium of claim 16, wherein the characteristics of the search space include a size and complexity of the search space and the workload on the quantum controller includes an error rate of the quantum controller, a temperature level of a quantum environment in which the quantum controller is executing, and a number of available qubits in the quantum environment in which the quantum controller is executing.

18. The non-transitory computer-readable medium of claim 17, wherein the processing device is further to:
- interface, by the QMVC Service, with a qubit registry of the quantum environment to reserve one or more of the available qubits in the quantum environment that are required to process the request.

19. The non-transitory computer-readable medium of claim 18, wherein to process the request using the quantum controller, the processing device is to:
- route, via the QMVC service, requests to write data and requests to access data between the model, the view, and the quantum controller.

20. The non-transitory computer-readable medium of claim 15, wherein the quantum controller is one of a plurality of quantum controllers that the execution environment is comprised of, each of the plurality of quantum controllers having a performance profile, and wherein the processing device is further to:
- receive a second request for execution by the application, the second request indicating one or more optimization factors the second request is to be optimized based on; and
- determine a particular quantum controller of the plurality of quantum controllers that the second request is to be processed on based on the one or more parameters and the performance profile of each of the plurality of quantum controllers.

* * * * *